Nov. 20, 1945.  A. C. STALEY  2,389,281
INSTRUMENT FOR INDICATING PRESSURES SUITED TO VARIOUS SPEEDS
Filed May 23, 1942   2 Sheets-Sheet 2
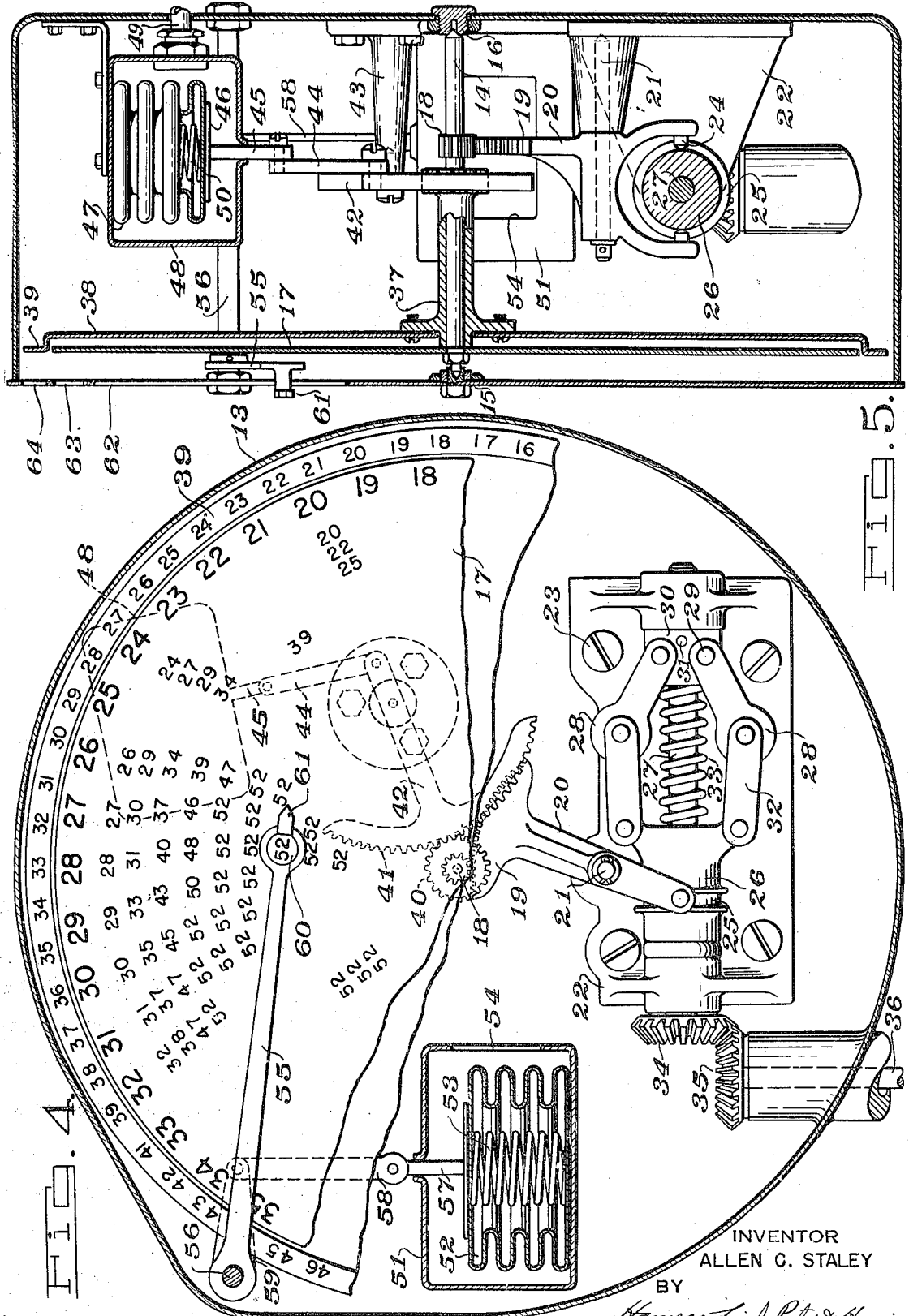
INVENTOR
ALLEN C. STALEY
BY
ATTORNEYS Patented Nov. 20, 1945

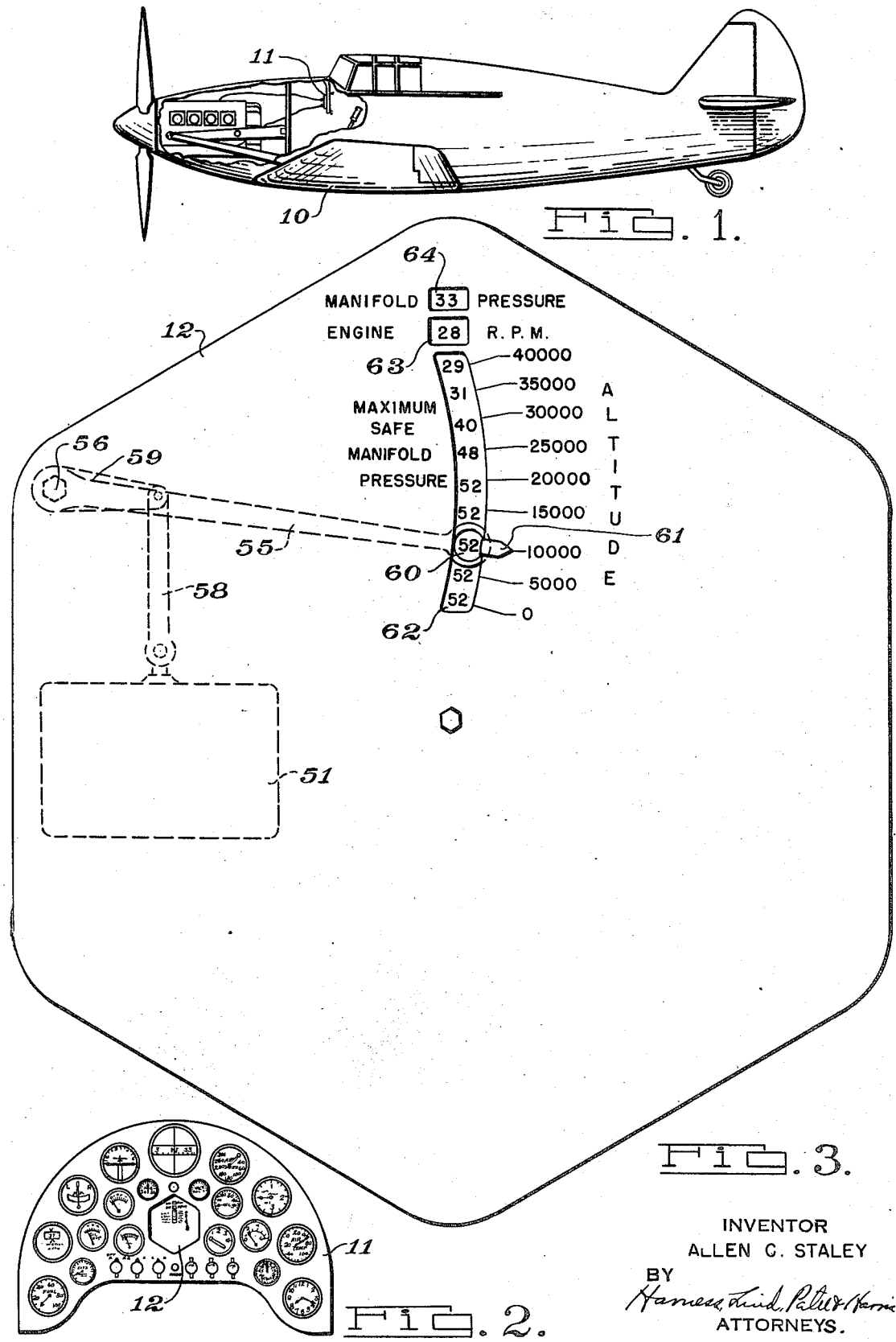

2,389,281

UNITED STATES PATENT OFFICE 2,389,281

INSTRUMENT FOR INDICATING PRESSURES SUITED TO VARIOUS SPEEDS

Allen C. Staley, Birmingham, Mich., assignor to Chrysler Corporation, Highland Park, Mich., a corporation of Delaware Application May 23, 1942, Serial No. 444,195

8 Claims. (Cl. 73—112)

This invention relates to indicating instruments, particularly instruments for aircraft.

In operation of aircraft provided with supercharged engines, difficulty has been experienced in keeping the engine manifold pressure within the "pumping limit" of the supercharger compressor.

All superchargers will stall or surge when the relation of the density and volume of air entering the inlet to the discharge pressure is not maintained within predetermined limits. The limiting discharge pressure, above which aerodynamic stalling will occur, decreases in value as the inlet air density decreases. The inlet air density changes, of course, with changes in altitude and temperature, and discharge pressure-altitude pumping limiting curves may be experimentally determined for any supercharger.

The engine manifold directly receives the discharge from the supercharger and it is clear that if the pumping or surge characteristics of the supercharger are known, the maximum safe manifold pressure for all conditions of engine operation can be determined.

It is the principal object of this invention to provide an indicating instrument adapted for mounting on the instrument panel of an airplane or other suitable location, which instrument shall at all times during operation of the engine, visibly indicate the maximum safe manifold pressure and the actual manifold pressure. Having these two values constantly visible on the instrument panel enables the pilot to correct his engine speed whenever necessary to maintain the actual manifold pressure at a value which is not in excess of the indicated safe manifold pressure.

A further object of the invention is to provide an improved instrument for aircraft which indicates on a single face-plate the engine manifold pressure, the engine speed, the altitude of the aircraft and the maximum safe manifold pressure at the altitude and speed being indicated.

Other objects are to provide such an instrument which is easily and cheaply manufactured, simple in design and construction and easily adaptable to various types of engines and planes.

Additional objects will become apparent from the following description which discloses two embodiments of the invention.

In the drawings,

Fig. 1 is an elevation of an airplane showing the location of the indicating instrument.

Fig. 2 is an enlarged view of the instrument panel of the Fig. 1 plane.

Fig. 3 is a greatly enlarged front view of the indicating instrument broken away in parts to show details thereof.

Fig. 4 is another view of the instrument with the face-plate removed and parts broken away to show details.

Fig. 5 is a vertical sectional view of the instrument.

Referring to Figs. 1-5, inclusive, it may be seen that the airplane 10 is provided with an instrument panel 11 which carries the usual indicating instruments, gauges, compass, etc. The instrument which forms the subject matter of this invention is designated by the numeral 12 and comprises a casing 13 (see Figs. 4 and 5) in which is rotatively mounted a shaft 14, suitable bearings 15, 16 being provided for supporting the shaft.

On the shaft 14 is mounted a dial 17, the face of which carries two sets of numerals representing respectively the speed of the engine in hundreds of revolutions per minute and the maximum safe manifold pressure of the engine in inches of mercury. The shaft 14 also carries a pinion 18 which meshes with a sector gear 19, the latter being formed as an integral part of a lever 20.

The lever 20 is pivotally mounted on a shaft 21 carried by a bracket 22 which is fastened in the casing by means of screws 23. The lower end of the lever is yoke-shaped and has trunnion pins 24 which engage a groove 25 formed in a collar 26, the latter being slidably and rotatably mounted on a shaft 27 carried by the bracket 22.

The collar 26 is part of a centrifugal governor which includes the flyball weights 28 pivoted at 29 on a collar 30. The collar 30 is staked to the shaft 27 by a pin 31 for rotation by the shaft. Links 32 connect the weights 28 with the collar 26. A coil spring 33 urges the collar 30 away from the collar 26.

The shaft 27 carries a bevel gear 34 which meshes with a similar gear 35 carried by a shaft 36 driven by the engine crankshaft. It may be seen therefore from the description so far that the dial 17 is rotated about the axis of the shaft 14 by linear travel of the collar 26 which travel is proportional to the speed of the engine crankshaft.

The shaft 14 also carries a sleeve 37 which is rotatable thereon and carries a dial 38. The latter has an indicia carrying portion 39 which is shaped to lie in the plane of the dial 17 and which carries numerals representing the actual pressure in the engine manifold in inches of mercury.

The sleeve 37 carries a pinion 40 which meshes with a sector gear 41 formed on a lever 42. The lever 42 is pivotally mounted in a bracket 43 and is connected by means of a link 44 with an actuating rod 45. The rod 45 has an enlarged plate-like end 46 which bears against a metal bellows 47. The latter is housed in a gas-tight casing 48 which is connected with the engine manifold by a pipe 49. A spring 50 of predetermined force is disposed inside the bellows which is evacuated. It is thus clear that rise and fall of the engine manifold pressure will cause corresponding rotation of the dial 38 by means of rod 45, link 44, lever 42 and pinion 40.

Also mounted in the casing 13 is an altimeter 51 of the conventional aneroid type which comprises a metal bellows 52 containing a coiled compression spring 53. The bellows is housed in a casing open at 54 to the atmosphere. The movement of the bellows 52 is transmitted to an indicating pointer 55 pivotally mounted in the casing 13 at 56 by means of a rod 57, a link 58 and a lever 59 as illustrated.

The pointer 55 is provided with a circular opening 60 adjacent its free end. One of the sets of numerals on the face plate 17 is arranged in a series of radial arcs and the numerals are of such size and arrangement that one of them will be "ringed" by the opening 60 as the pointer 55 swings about its pivot 56.

The pointer is also provided with an end piece 61 which is axially offset such that it is adapted to lie adjacent the outer surface of the face plate 12. This is illustrated in Fig. 3. The face plate 12 carries a set of numerals for indicating the altitude of the airplane as illustrated, and has three openings for separately exposing the numerals carried by the dials 17 and 38. The arcuate opening 62 is of such length and disposition that it exposes the radial columns of numerals on dial 17 which indicate the maximum safe engine manifold pressure. As this dial rotates under control of the speed responsive governor mechanism successive columns of numerals are aligned with the opening 62 and the opening 60 in pointer 55 rings one of the exposed numerals thus indicating the maximum safe manifold pressure for a particular engine speed and altitude.

The opening 63 is arranged in such manner that it exposes the outer set of numerals on dial 17 which indicate the engine speed. The opening 64 exposes the numerals carried by the portion 39 of dial 38 which indicate the actual manifold pressure of the engine.

It may thus be seen that I have combined in one instrument means for indicating the altitude of the airplane, the speed of the engine, the actual pressure existing in the engine manifold, and the maximum safe manifold pressure for all conditions of engine speed and altitude. In short, my novel instrument combines the functions of an altimeter, tachometer and manifold pressure gauge and in addition indicates to the pilot the maximum manifold pressure for safe operation of the engine supercharger at all speeds and altitudes.

The dials and openings of the instrument are arranged in such manner that the pilot or flight engineer can tell at a glance just what the maximum safe manifold pressure is at any instant during operation of the engine and can compare it with the actual pressure.

The operation of the instrument is believed to be clear from the description, it being understood that the dial 17 will be rotated by the speed responsive governor mechanism to a position corresponding to the engine crankshaft speed at any instant. The numerals indicating crankshaft speed and the maximum safe manifold pressure will thus be visible through the openings 62 and 63. The altimeter 51 will act to move the pointer 55 to a position indicating the altitude of the plane and at the same time the opening 60 of the pointer will ring one of the numerals exposed by opening 62 which corresponds to the safe pressure at that altitude. Simultaneously, the dial 38 is rotated to a position determined by the engine manifold pressure which acts through the bellows 47 and the corresponding numeral is exposed in opening 64.

I claim:

1. In an indicating instrument for aircraft having a supercharged engine, and wherein the supercharger is driven in timed relation to the engine, a movable dial having a plurality of scales thereon for indicating the maximum safe supercharger discharge pressure for various engine speeds; engine speed responsive means for controlling the position of said dial; a pointer mounted such that it is adapted to sweep across said dial thereby to designate one of the figures of one of said scales; and altitude responsive means for controlling the position of said pointer.

2. The combination of claim 1 wherein an altitude scale is positioned in operative association with said pointer whereby said pointer indicates both altitude and maximum safe pressure simultaneously.

3. The combination of claim 1 wherein said dial is also provided with a scale calibrated in engine revolutions whereby said instrument is adapted to indicate engine speed and maximum safe pressure simultaneously.

4. In an indicating instrument for aircraft having a supercharged engine, a movable dial having rows of figures thereon for indicating the maximum supercharger discharge pressure at which the supercharger may be operated without stalling, a cover for the dial, said cover being formed with an aperture through which one of the rows is visible, means driven in timed relation to the speed of the supercharger for moving said dial to various positions corresponding to different supercharger speeds, whereby one of the rows of figures is visible through the aperture at any one time, a pointer mounted to sweep across the aperture, said pointer having an opening formed therein to encircle one of the figures of the exposed row, and altitude responsive means for controlling the position of the pointer.

5. In an indicating instrument for aircraft having a supercharged engine and wherein the supercharger is driven in timed relation to the engine, a movable dial member having a plurality of scales thereon for indicating the maximum safe supercharger discharge pressure for various engine speeds, a pointer member mounted such that it is adapted to sweep across the dial thereby to designate one of the figures of one of said scales, engine speed responsive means for controlling the position of one of said members, and altitude-responsive means for controlling the position of the other member.

6. An indicating instrument comprising a member carrying a plurality of scales for indicating certain pressures for various speeds, a locating member mounted so as to be adapted to pass across the scale-carrying member thereby to designate one of the figures of one of said scales, means responsive to speed for controlling one member, and means responsive to pressure for controlling the position of the other member.

7. An indicating instrument comprising a member carrying a plurality of scales for indicating certain pressures for various speeds, a locating member mounted so as to be adapted to pass across the scale-carrying member thereby to designate one of the figures of one of said scales, means responsive to speed for controlling the position of the scale-carrying member, and means responsive to pressure for controlling the position of the locating member.

8. An indicating instrument comprising means carrying a plurality of scales for indicating certain pressures for various speeds, index means for designating one of said plurality of scales, means responsive to speed for moving said scale-carrying means and said index means relatively to each other for indicating a certain scale of the aforesaid plurality of scales, and means responsive to pressure for indicating a certain pressure in the certain scale of pressures.

ALLEN C. STALEY.